US009578670B2

(12) United States Patent
Hwang

(10) Patent No.: US 9,578,670 B2
(45) Date of Patent: Feb. 21, 2017

(54) METHOD FOR MATCHING MULTIPLE DEVICES, DEVICE FOR ENABLING MATCHING THEREOF AND SERVER SYSTEM

(71) Applicant: FuturePlay Inc., Seoul (KR)

(72) Inventor: Sung Jae Hwang, Seoul (KR)

(73) Assignee: FuturePlay Inc. (KR)

( * ) Notice: Subject to any disclaimer, the term of this patent is extended or adjusted under 35 U.S.C. 154(b) by 0 days.

(21) Appl. No.: 14/805,187

(22) Filed: Jul. 21, 2015

(65) Prior Publication Data

US 2015/0327316 A1   Nov. 12, 2015

Related U.S. Application Data

(63) Continuation-in-part of application No. PCT/KR2014/003979, filed on May 2, 2014.

(30) Foreign Application Priority Data

May 2, 2013   (KR) .................. 10-2013-0049279

(51) Int. Cl.
*H04W 76/02* (2009.01)
*H04W 4/00* (2009.01)
(Continued)

(52) U.S. Cl.
CPC .......... *H04W 76/023* (2013.01); *G06F 3/0346* (2013.01); *H04W 4/001* (2013.01); *H04W 4/027* (2013.01); *H04W 8/005* (2013.01)

(58) Field of Classification Search
CPC .... H04W 64/003; H04W 88/06; H04W 4/005; H04W 4/023; H04W 4/025; H04W 4/22
See application file for complete search history.

(56) References Cited

U.S. PATENT DOCUMENTS

2009/0289904 A1* 11/2009 Park .................... G06F 3/04817
345/173
2012/0075439 A1* 3/2012 Gong .................... H04N 5/247
348/61

(Continued)

FOREIGN PATENT DOCUMENTS

JP     2006/350588 A    12/2006
KR  10-2012-0054743 A    5/2011
KR  10-2011-0096005 A    8/2011

*Primary Examiner* — Joseph Dean, Jr.
(74) *Attorney, Agent, or Firm* — Dinsmore & Shohl LLP; Yongsok Choi

(57) ABSTRACT

The present invention relates to a method for matching multiple devices, and a device and a server system for enabling the matching thereof. According to one aspect of the invention, provided is a matching method comprising: determining, from a perspective of a first device, characteristic information on a motion of the first device; determining, from a perspective of a second device, characteristic information on at least one of the motion of the first device, an input to the second device according to the motion of the first device, an operation on the second device according to the motion of the first device, and a location change of the first device caused by the motion of the first device; and matching the first device and the second device based on the characteristic information determined from the perspective of the first device and the characteristic information determined from the perspective of the second device.

20 Claims, 9 Drawing Sheets

(51) Int. Cl.
*H04W 4/02* (2009.01)
*G06F 3/0346* (2013.01)
*H04W 8/00* (2009.01)

(56) References Cited

U.S. PATENT DOCUMENTS

| | | |
|---|---|---|
| 2012/0115503 A1 | 5/2012 | Lynch et al. |
| 2012/0238298 A1* | 9/2012 | Sip ............... G01C 21/12 455/456.6 |
| 2012/0263154 A1 | 10/2012 | Blanchflower et al. |
| 2012/0306768 A1* | 12/2012 | Bailey ............... G09G 5/00 345/173 |
| 2014/0257730 A1* | 9/2014 | Czompo ............ H04L 67/12 702/89 |

\* cited by examiner

METHOD FOR MATCHING MULTIPLE DEVICES, DEVICE FOR ENABLING MATCHING THEREOF AND SERVER SYSTEM

PRIORITY CLAIM

This application is a continuation-in-part application of Patent Cooperation Treaty (PCT) international application Serial No. PCT/KR2014/003979, filed on May 2, 2014 and which designates the United States, which claims the benefit of the filing date of Korean Patent Application Serial No. 10-2013-0049279, filed on May 2, 2013. The entirety of both PCT international application Serial No. PCT/KR2014/003979 and Korean Patent Application Serial No. 10-2013-0049279 are incorporated herein by reference.

FIELD OF THE INVENTION

The present invention relates to a method for matching multiple devices, and a device and a server system for enabling the matching thereof.

BACKGROUND

The statements in this section merely provide background information related to the present disclosure and may not constitute prior art.

Recently, mobile smart devices having various communication and sensing capabilities and powerful computing capabilities, such as smart phones and smart pads, are being widely used. Among such mobile smart devices, there are relatively small-sized ones that may be worn and carried on a body of a user (e.g., a smart glass, a smart watch, a smart band, a smart device in the form of a ring or a brooch, a smart device directly attached to or embedded in a body or a garment, etc.)

In this situation, a user may desire to perform a task using two or more (different kinds of) smart devices of the user, or may desire a task to be performed in which smart devices of the user and another user are required to be involved together. However, this (latent) intention of the user could not have been properly supported in prior art.

SUMMARY OF THE INVENTION

One object of the present invention is to fully solve the above problem in prior art.

Another object of the invention is to provide a novel technique for matching multiple devices.

Yet another object of the invention is to allow the matching of multiple devices to enable the realization of applied techniques.

According to one aspect of the invention to achieve the objects as described above, there is provided a matching method comprising the steps of: determining, from a perspective of a first device, characteristic information on a motion of the first device, and determining, from a perspective of a second device, characteristic information on at least one of the motion of the first device, an input to the second device according to the motion of the first device, an operation on the second device according to the motion of the first device, and a location change of the first device caused by the motion of the first device; and matching the first device and the second device on the basis of the characteristic information determined from the perspective of the first device and the characteristic information determined from the perspective of the second device.

In addition, there are further provided other methods and devices to implement the invention.

According to the invention, a novel technique for matching multiple devices is provided.

According to the invention, the matching of multiple devices enables the realization of applied techniques.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF THE PREFERRED EMBODIMENTS

Figure 1:
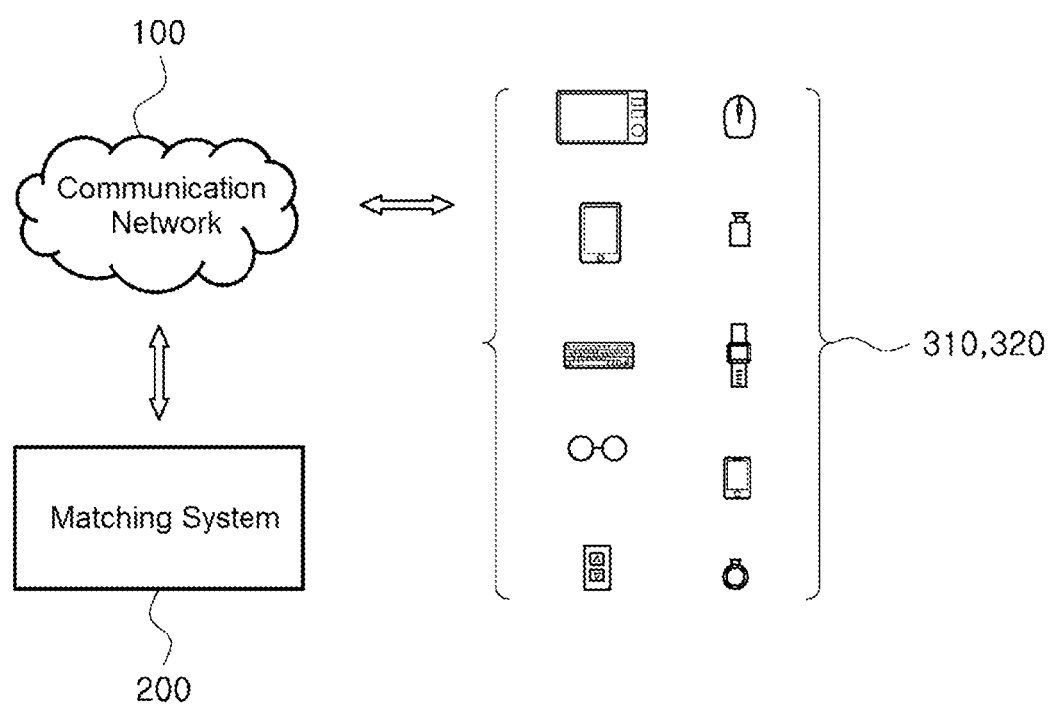
FIG. 1 is a schematic diagram showing the configuration of an entire system for matching multiple devices according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of an Entire System

FIG. 1 is a schematic diagram showing the configuration of an entire system for matching multiple devices according to one embodiment of the invention.

As shown in FIG. 1, the entire system according to one embodiment of the invention may comprise a communication network 100, a matching system 200, and multiple devices 310, 320.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

Next, the matching system 200 according to one embodiment of the invention may be digital equipment having a memory means and a microprocessor for computing capabilities. The matching system 200 may be a server system.

Figure 5:
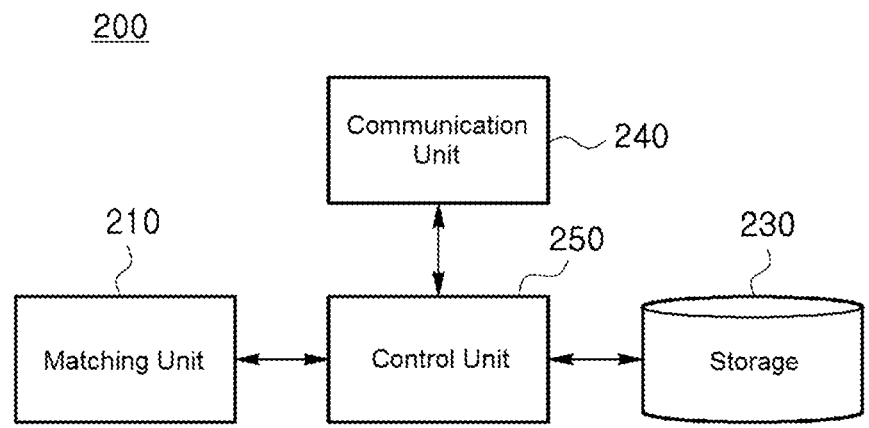
FIG. 5 is a schematic diagram showing the configuration of a matching system according to one embodiment of the invention.

FIG. 5 is a schematic diagram showing the configuration of the matching system according to one embodiment of the invention. As shown in FIG. 5, the matching system 200 may comprise a matching unit 210, a storage 230, a communication unit 240, and a control unit 250. According to one embodiment of the invention, at least some of the matching unit 210, the storage 230, the communication unit 240, and the control unit 250 may be program modules to communicate with at least one of the multiple devices 310, 320. The program modules may be included in the matching system 200 in the form of operating systems, application program modules or other program modules, while they may be physically stored on a variety of commonly known storage devices. Further, the program modules may also be stored in a remote storage device that may communicate with the matching system 200. Meanwhile, such program modules may include, but not limited to, routines, subroutines, programs, objects, components, data structures and the like for performing specific tasks or executing specific abstract data types as will be described below in accordance with the invention. Particularly, the matching system 200 may function to mediate so that via the communication network 100, one of the devices 310, 320 may transmit information or a control command to the other, or the one may receive information or a control command from the other.

To this end, as will be described in detail below, the matching system 200 may receive one type of temporary or non-temporary characteristic information on a first device 310 from the first device 310 and receive another type of temporary or non-temporary characteristic information on the first device 310 from a second device 320, and then may compare or collate the pieces of the information to recognize that the first device 310 and the second device 320 have an association (e.g., indicating that they belong to the same user, they function for the sake of the same user, they are located substantially close to each other, or one of them is competent to authenticate or permit the other). (Hereinafter, such recognition itself, or formation of a connection between the devices 310, 320 according to the recognition, is mainly referred to as "matching" for convenience.) The matching may be permanent, but may preferably be maintained only for a predetermined time period and then released.

The matching may be performed by the matching unit 210 included in the matching system 200. The matching unit 210 may reside in the matching system 200 in the form of a program module as described above.

Further, the matching system 200 may further function to store information provided from at least one of the devices 310, 320 and allow the information to be used by at least one of the devices 310, 230 or by another third device (not shown). The storing may be performed by the storage 230 included in the matching system 200. The storage 230 encompasses a computer-readable recording medium, and may refer not only to a database in a narrow sense but also to a database in a broad sense including file system-based data records and the like.

Meanwhile, the communication unit 240 in the matching system 200 may function to enable data transmission/receipt to/from the matching unit 210 and the storage 230.

Further, the control unit 250 in the matching system 200 may function to control data flow among the matching unit 210, the storage 230, and the communication unit 240. That is, the control unit 250 according to the invention may control data flow into/out of the matching system 200 or data flow among the respective components of the matching system 200, such that the matching unit 210, the storage 230, and the communication unit 240 may carry out their particular functions, respectively.

The function of the matching system 200 will be discussed in more detail below. Meanwhile, although the matching system 200 has been described as above, the above description is illustrative and it is apparent to those skilled in the art that at least some of the functions or components required for the matching system 200 may be implemented or included in another third device, and even in at least one of the devices 310, 320 to be matched, as necessary.

Figure 6A:
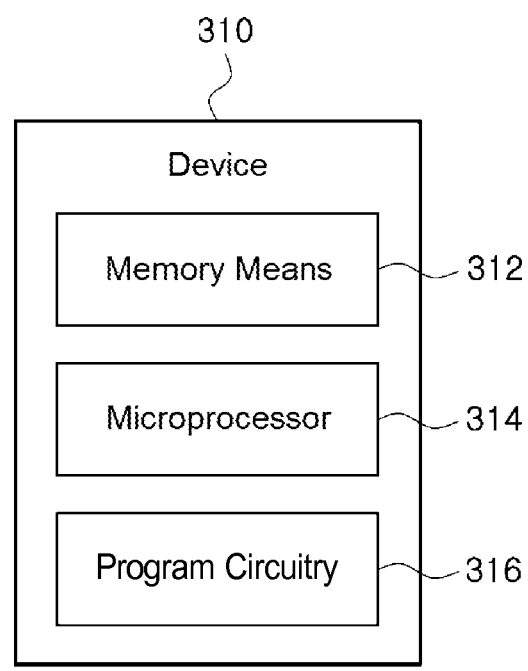
FIGS. 6A and 6B are schematic diagrams showing the configurations of devices according to one embodiment of the invention.
Figure 6B:
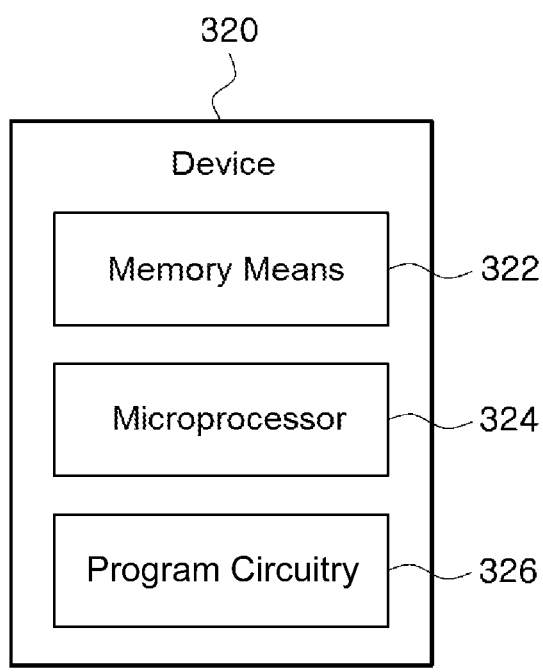

Lastly, the multiple devices 310, 320 according to one embodiment of the invention are digital equipment that may function to connect to and then communicate with the matching system 200, a counterpart of the multiple devices 310, 320 (which may preferably be separated or externalized from each other), or another third device, and any type of digital equipment having memory means 312, 322 and microprocessors 314, 324 for computing capabilities may be adopted as the devices 310, 320 according to the invention. The devices 310, 320 may be so-called smart devices such as a smart phone, a smart pad, a smart glass, a smart watch, a smart band, and a smart ring, or may be somewhat traditional devices such as a desktop computer, a notebook computer, a workstation, a personal digital assistant (PDA), a web pad, a mobile phone, buttons, a mouse, a keyboard, and an electronic pen. Meanwhile, the devices 310, 320 may further include technical means (not shown) and program circuitry 316, 326 to be described below. In connection with the schematic configurations of the devices 310, 320 according to one embodiment of the invention, further reference may be made to FIGS. 6A and 6B, respectively.

The devices 310, 320 may include at least one technical means for calculating a physical value regarding a behavior of a user of the devices or a temporary or non-temporary attribute thereof. Examples of the technical means may include commonly known components such as a motion sensor, an acceleration sensor, a positioning sensor like a gyro sensor, a magnetic sensor, a camera, a touch panel, a pointing tool (e.g., a mouse, a stylus, an electronic pen, etc.), a graphical object operable by the user, and a positioning module (a GPS module, a beacon-based positioning (position identification) module, etc.)

Further, the devices 310, 320 may further include an application program for processing the above physical value to transmit information or a control command to another device (310, 320, or the like), to receive information or a control command from another device (310, 320, or the like), or to generate the information or control command. The application may reside in the corresponding devices 310, 320 in the form of program modules. The program circuitry 316, 326 operates or executes the program modules in communication with the microprocessor 314. The nature of the program modules may be generally similar to that of the aforementioned matching unit 210 of the matching system 200.

Meanwhile, when the matching is made between the devices 310, 320, the application may control the devices 310, 320 to make some response so that a user may notice the matching. For example, the devices 310, 320 may provide the user with a visual, aural, or tactual response. The response may be, for example, displaying of a matching report message, emitting of a clear matching report sound, a matching report vibration that may be sensed in a hand, or the like.

Meanwhile, at least a part of the application may be replaced with a hardware or firmware device that may perform a substantially equal or equivalent function, as necessary.

The function of the application will be discussed in detail below.

Matching Methods

Hereinafter, specific examples of methods for matching the multiple devices 310, 320 according to various embodiments of the invention will be discussed in detail.

First Embodiment

According to the present embodiment, the first device 310 and the second device 320 may be matched on the basis of a motion of the first device 310 identified in the first device 310 and a motion of the first device 310 identified by the second device 320, or a motion of a body part or the like of a user of the first device 310 interworking with the first device 310. Preferably, the first device 310 may be a device such as a smart phone and a smart watch, which is frequently carried by the user, and in many cases, is considered to be suitable to store and process important information of the user.

First, it is assumed that the user has moved the first device 310. In this case, the first device 310 may calculate a physical value regarding its motion by means of at least one of a motion sensor, an acceleration sensor, a gyro sensor, a magnetic sensor and the like, which may be embedded therein. Next, on the basis of the calculated physical value, an application (not shown) of the first device 310 may determine a trajectory of the motion of the first device 310 in the form of a set of points in a three-dimensional coordinate system, a set of points in a two-dimensional coordinate system obtained by projecting the former points onto a plane, or a set obtained by scaling or normalizing the former sets. The determined trajectory may include at least one singular point. The singular point may be a point at a specific time (e.g., a peak point for a specific coordinate axis), which represents a drastic motion change on the trajectory. The application of the first device 310 may determine two or more singular points, and also a time interval between the singular points. The application of the first device 310 may accordingly determine highly characteristic information on the motion of the first device 310. (This characteristic information may be referred to as characteristic information from a perspective of the first device 310.) The characteristic information on the motion of the first device 310 may be provided to the matching system 200. Further, the characteristic information may be provided from the first device 310 to the second device 320, by means of the matching system 200 or not.

Meanwhile, although it has been described that the present embodiment may achieve the matching (to be described below) on the basis of the characteristic information on the motion of the first device 310, it is apparent to those skilled in the art that the matching may also be achieved on the basis of acceleration characteristics (e.g., a set of accelerations per time period) according to the motion of the first device 310. Meanwhile, it is to be understood that the characteristics of a motion herein do not only encompass the characteristics of a displacement or the like, but also encompass, in a broad sense, those of an acceleration being a second order derivative of the motion.

Hereinafter, it will be discussed how the matching is achieved between the first device 310 and the second device 320 on the basis of the characteristic information on the motion of the first device 310.

(1) The Case in which the Second Device 320 Observes the First Device 310

It is assumed that the second device 320 includes or communicates with a camera to observe and photograph the aforementioned motion of the first device 310. An application (not shown) of the second device 320 may calculate a corresponding pixel flow from a series of photographed images of the first device 310 (or a body part of the corresponding user interworking with the first device 310) to determine a trajectory of the motion of the first device 310, and singular points thereof. Therefore, the second device 320 may independently determine characteristic information on the motion of the first device 310. (This characteristic information, and similar information to be described below, may be referred to as characteristic information from a perspective of the second device 320.) The determined information may also be provided to the matching system 200, or may be provided to the first device 310, if necessary.

The matching system 200, the first device 310, or the second device 320 may match the first device 310 and the second device 320 on the basis of the pieces of the characteristic information on the motion of the first device 310, and may accordingly notify the matching to at least one of the first device 310 and the second device 320.

At least one of the first device 310 and the second device 320 may perform various processes on the basis of the matching. For example, it is enabled that information (e.g. a computer file) is transmitted or received between the devices 310, 320, or that one of the devices 310, 320 or the user thereof performs a specific process for the sake of the other of the devices 310, 320 or the user thereof (e.g., an electronic gate (not shown) interworking with the second device 320 is opened for the sake of the user of the first device 310.) In the above example, identification information (e.g., a device serial number, a PIN number, a telephone number, etc.) of the first device 310, which may be previously registered in the second device 320, may be further consulted.

(2) The Case in which the Second Device 320 Directly Receives an Input Associated with a Gesture of a User of the First Device 310

It is assumed that the first device 310 may identify a gesture of a body part (e.g., right wrist) of a user thereof, like a smart watch or a smart band, and that the second device 320 includes or at least communicates with a touch panel for receiving a touch input associated with the above gesture of the user of the first device 310, a pointing tool (e.g., a mouse, a stylus, an electronic pen, etc.) for sensing a motion associated with the above gesture of the user of the first device 310, or other input tools (e.g. buttons, a keyboard, etc.)

The characteristic information on the motion of the first device 310 may be determined according to the gesture of the user of the first device 310 as described above. Further, the application of the second device 320 may determine characteristic information on a touch input associated with the gesture, a motion input of a pointing tool, or a press input of other input tools (i.e., motion characteristic information). The determined information may also be provided to the matching system 200, or may be provided to the first device 310, if necessary.

The matching system 200, the first device 310, or the second device 320 may match the first device 310 and the second device 320 on the basis of the characteristic information on the motion of the first device 310 and the characteristic information on the input to the second device 320, and may accordingly notify the matching to at least one of the first device 310 and the second device 320.

Meanwhile, if the first device 310 may be relatively freely worn on different body parts (e.g., wrists, forearms, etc.) of the user, the matching may be made after correcting the characteristic information on the motion of the first device 310 (e.g., the above-described trajectory of the motion of the first device 310). For example, if a smart watch is worn on a forearm instead of a wrist, the correction may include increasing only the length of the vector of each point of the trajectory in a three or two dimensional coordinate system in equal proportion, with the direction thereof being maintained, to compensate for the reduced size of the trajectory, which can also be considered as a kind of the aforementioned normalization. The above trajectory compensation may also be useful when the smart watch is worn on the wrist with different strap tightness due to a sleeve or the like. The trajectory compensation may also be useful in the embodiment of the case (3) to be described below.

At least one of the first device 310 and the second device 320 may perform various processes on the basis of the matching. For example, if the user of the first device 310 inputs a unique signature or another pattern to a touch panel of the second device 320, or draws a unique signature or another pattern with a pointing tool of the second device 320, with the first device 310 worn on the right wrist (if right-handed), then the second device 320 may employ the above signature or pattern and identification information (e.g., a device serial number, a PIN number, a telephone number, etc.) of the first device 310, which may be previously registered in the second device 320, as a key to perform authentication for permitting the user of the first device 310 to use the second device 320 only when the user inputs a correct signature or pattern with the first device 310 worn on the right wrist.

Figure 2:
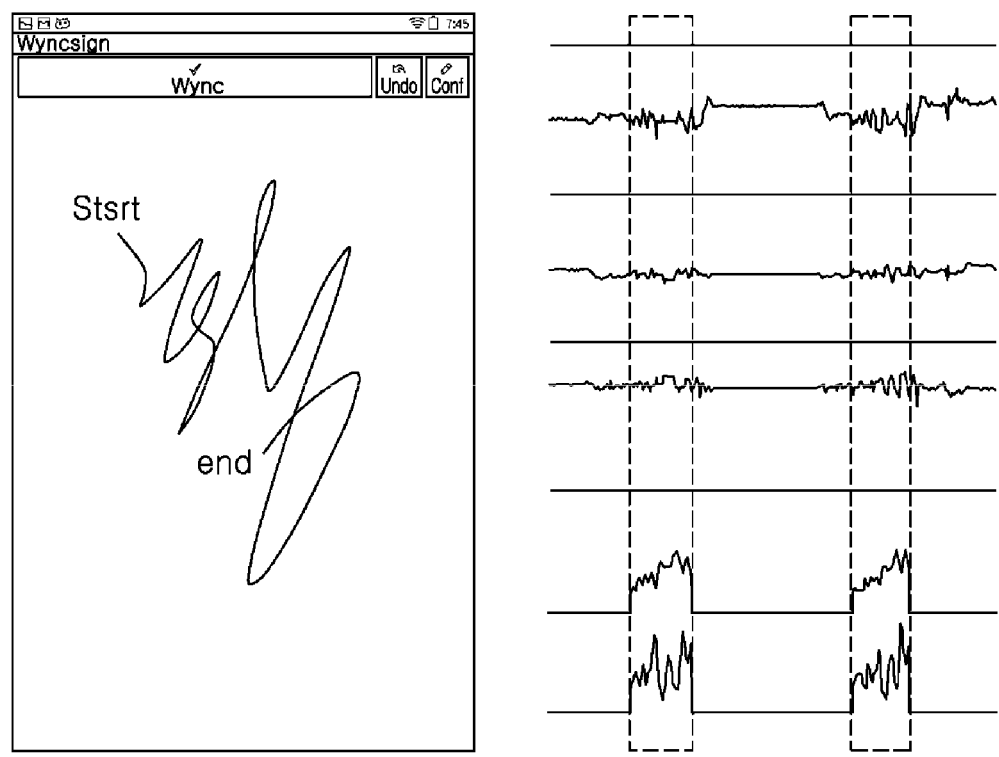
FIG. 2 is a reference view of one test example in which singular points are calculated when a specific signature is inputted to a second device.
Figure 3:
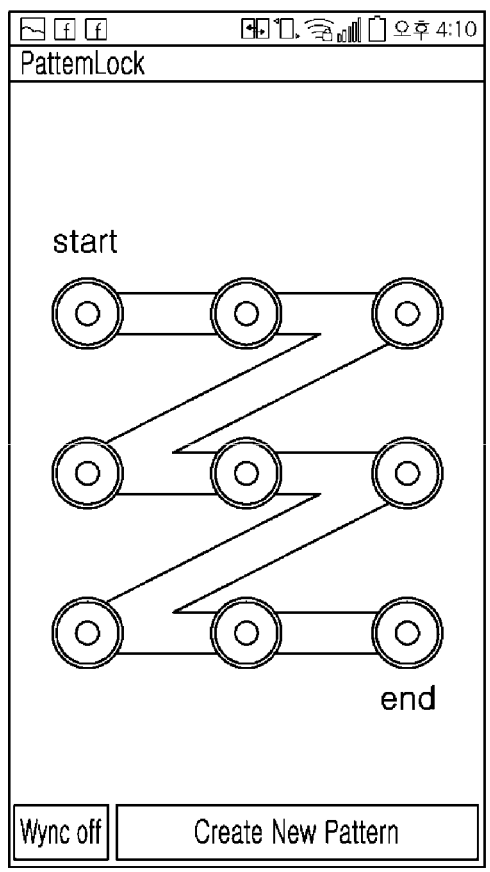
FIG. 3 is a reference view of one test example in which singular points are calculated when a specific pattern is inputted to the second device.
Figure 3:
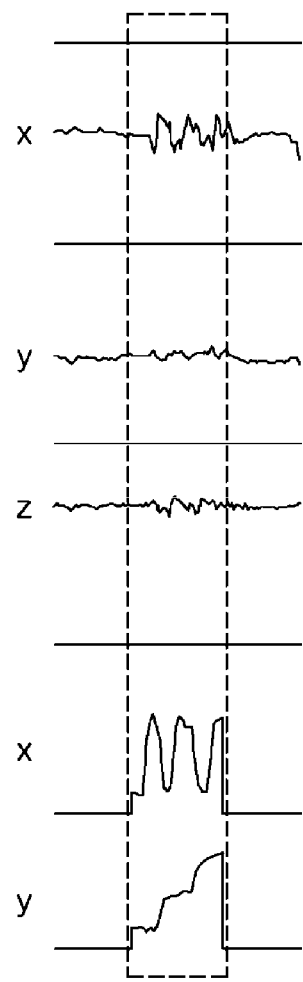

FIG. 2 is a view of a test in which singular points are calculated when a specific signature is inputted to the second device 320, which may be consulted in connection with the present embodiment. Further, FIG. 3 is a view of a test in which singular points are calculated when a specific pattern is inputted to the second device 320, which may be consulted in connection with the present embodiment.

Meanwhile, although it has been mainly described above that the gesture of the user of the first device 310 is on the basis of the user's positive intention, the gesture may also naturally occur while the user makes a touch input to the second device 320. Further reference will be made to FIG. 7.

Figure 7:
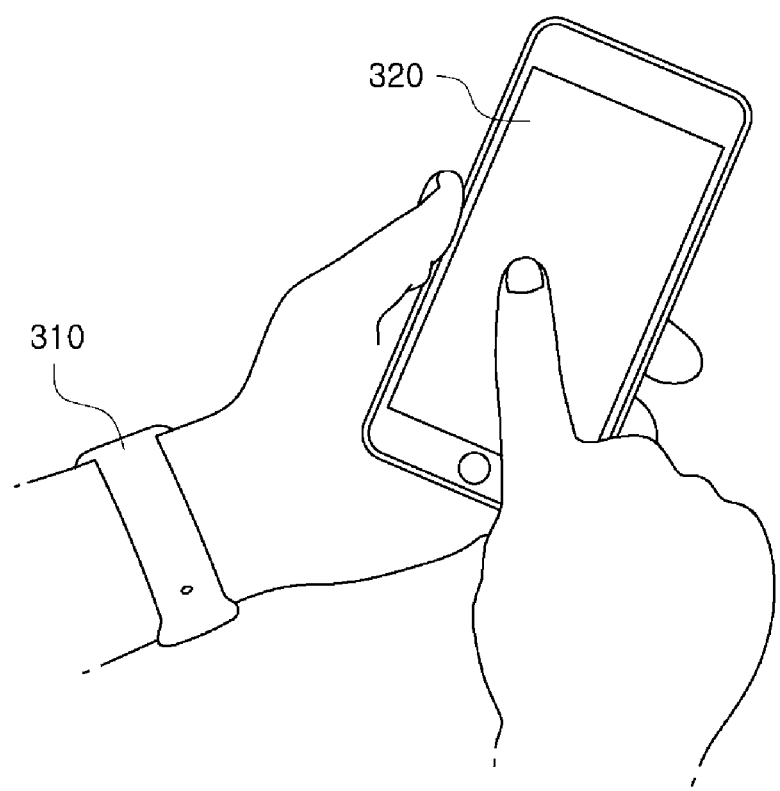
FIG. 7 is a reference view showing that a user wearing a first device on a left wrist touches a second device held in a left hand with a right hand, according to one embodiment of the invention.

FIG. 7 is a view showing that a user wearing the first device 310 on a left wrist (if right-handed) touches the second device 320 held in a left hand with a right hand, according to one embodiment of the invention. In the case of FIG. 7, although the gesture of the user for the first device 310 (i.e., wrist shaking) is actually a passive one caused by the user's touch input to the second device 320, the matching may also be made in this case because the first device 310 and the second device 320 are eventually put in similar motion.

(3) The Case in which an Operation Associated with a Gesture of a User of the First Device 310 is Performed on the Second Device 320

According to one embodiment of the invention, it is assumed that the first device 310 may identify a gesture of a body part (e.g., right wrist) of a user thereof, like a smart watch or a smart band, and that an operation on a graphical object (e.g., an unlock bar that can be slid to unlock, an icon of a specific file or application program, etc.) associated with the above gesture of the user of the first device 310 is performed on the second device 320.

The characteristic information on the motion of the first device 310 may be determined according to the gesture of the user of the first device 310 as described above. Further, the application of the second device 320 may determine characteristic information on the operation on the graphical object associated with the gesture (i.e., motion characteristic information). The determined information may also be provided to the matching system 200, or may be provided to the first device 310, if necessary.

The matching system 200, the first device 310, or the second device 320 may match the first device 310 and the second device 320 on the basis of the characteristic information on the motion of the first device 310 and the characteristic information on the operation on the second device 320, and may accordingly notify the matching to at least one of the first device 310 and the second device 320.

At least one of the first device 310 and the second device 320 may perform various processes on the basis of the matching. For example, if the user of the first device 310 performs an operation of sliding an unlock bar of the second device 320, with the first device 310 worn on the right wrist (if right-handed), then the second device 320 may employ the gesture of the above operation and identification information (e.g., a device serial number, a PIN number, a telephone number, etc.) of the first device 310, which may be previously registered in the second device 320, as a key to perform authentication for permitting the user of the first device 310 to unlock the second device 320 only when the user performs a correct operation with the first device 310 worn on the right wrist.

Further, at least one of the first device 310 and the second device 320 may also perform another process on the basis of the matching. For example, if the user of the first device 310 performs an operation of (quickly) dragging an icon of a specific file of the second device 320 on a screen thereof, with the first device 310 worn on the right wrist (if right-handed), then the second device 320 may employ the gesture of the above operation and identification information (e.g., a device serial number, a PIN number, a telephone number, etc.) of the first device 310, which may be previously registered in the second device 320, as a key to allow the file to be transferred from the second device 320 and stored in an account of a cloud server (not shown), which may be previously registered for the user of the first device 310, only when the user performs a proper operation with the first device 310 worn on the right wrist. In this case, the file may be first stored in the matching system 200 and then stored in the cloud server.

According to another embodiment of the invention, it is assumed that the first device 310 may identify a gesture of a body part (e.g., right wrist) of a user thereof, like a smart watch or a smart band, and that an action or operation associated with the above gesture of the user of the first device 310 is performed for a specific application program (e.g., a web browser or a mobile game) running on the second device 320.

The characteristic information on the motion of the first device 310 may be determined according to the gesture of the user of the first device 310 as described above. Further, the application running on the second device 320 may determine characteristic information on the action or operation therefor associated with the gesture (i.e., motion characteristic information). For example, if the gesture of the user of the first device 310 is a touch action for (a graphical object of) the application running on the second device 320 (preferably, an action including sweep, an action including several taps, or other action having some pattern), the application may sense the touch action and then determine the characteristic information thereon. The determined information may also be provided to the matching system 200, or may be provided to the first device 310, if necessary.

The matching system 200, the first device 310, or the second device 320 may match the first device 310 and the second device 320 on the basis of the characteristic information on the motion of the first device 310 and the characteristic information on the action or operation for the application running on the second device 320, and may accordingly notify the matching to at least one of the first device 310 and the second device 320.

At least one of the first device 310 and the second device 320 may perform various processes on the basis of the matching. For example, if the user of the first device 310 performs a touch action for a web browser (displaying a portal site for which the user has signed up) running on the second device 320, with the first device 310 worn on the wrist, then the second device 320 may employ the gesture of the above touch action and login information for the portal site of the user of the first device 310, which may be previously registered in the first device 310, as a key to allow the user to login to the portal site without requiring additional actions.

Figure 8:
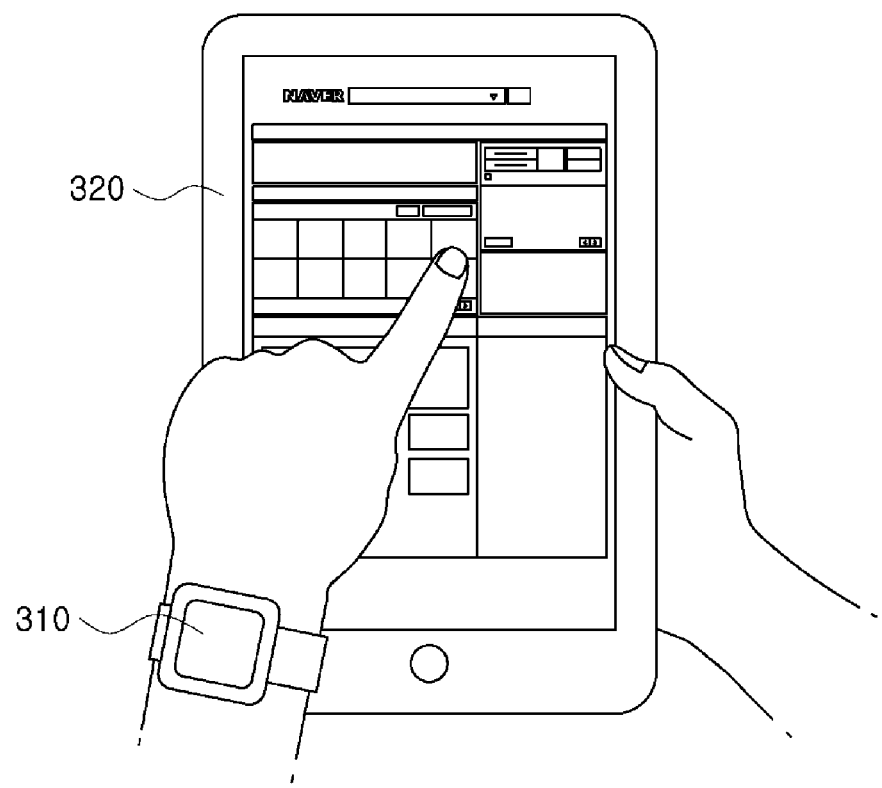
FIG. 8 is a reference view showing a situation in which a user of a first device performs a touch action for a web browser running on a second device so as to conveniently login to a portal site displayed in the web browser, according to one embodiment of the invention.

In connection with the above embodiment, reference may be made to FIG. 8, which is a view showing a situation in which the user of the first device 310 performs a touch action for the web browser running on the second device 320 so as to conveniently login to the portal site displayed in the web browser.

(4) The Case in which the Second Device 320 Measures a Location of the First Device 310

It is assumed that the first device 310 may identify a location thereof and the second device 320 may accurately measure the location of the first device 310 by means of multiple (preferably three or more) beacons or the like.

As the location of the first device 310 is changed, characteristic information on the location change of the first device 310 may be determined according to the above-described principles or the like. Further, the application of the second device 320 may independently determine characteristic information on the location change of the first device 310 (i.e., motion characteristic information). The determined information may also be provided to the matching system 200, or may be provided to the first device 310, if necessary.

The matching system 200, the first device 310, or the second device 320 may match the first device 310 and the second device 320 on the basis of the pieces of the characteristic information on the location change of the first device 310, and may accordingly notify the matching to at least one of the first device 310 and the second device 320.

At least one of the first device 310 and the second device 320 may perform various processes on the basis of the matching. For example, it is enabled that information (e.g. a computer file) is transmitted or received between the devices 310, 320, or that one of the devices 310, 320 or the user thereof performs a specific process for the sake of the other of the devices 310, 320 or the user thereof (e.g., an elevator (not shown) interworking with the second device 320 is requested for the sake of the user of the first device 310, and then the elevator is automatically requested to ascend or descend to a floor frequently visited by the user of the first device 310.)

Second Embodiment

According to the present embodiment, the first device 310 and the second device 320 may be matched with each other on the basis of a motion of the first device 310 identified by a camera of the first device 310 and a motion of the first device 310 identified by a camera of the second device 320. Preferably, the first device 310 may be a device such as a smart phone, which is frequently carried by a user, and in many cases, is considered to be suitable to store and process important information of the user.

It is assumed that the user has moved the first device 310. In this case, the camera of the first device 310 may photograph a specific object (not shown) (e.g., the face of the user of the first device 310) while it is moved, and generate a series of images. Accordingly, an application of the first device 310 may calculate a corresponding pixel flow from the series of images to determine a trajectory of the movement of the first device 310, and singular points thereof. Therefore, the application of the first device 310 may determine characteristic information on the movement of the first device 310.

Meanwhile, the camera of the second device 320 may photograph none other than the first device 310 while the first device 310 is moved as above, and generate another series of images. Therefore, an application of the second device 320 may calculate a corresponding pixel flow from the other series of images to independently determine characteristic information on the movement of the first device 310.

The two pieces of the determined information may be provided to the matching system 200, or may be provided to the first device 310 or the second device 320, if necessary.

The matching system 200, the first device 310, or the second device 320 may match the first device 310 and the second device 320 on the basis of the pieces of the characteristic information on the movement of the first device 310, and may accordingly notify the matching to at least one of the first device 310 and the second device 320.

At least one of the first device 310 and the second device 320 may perform various processes on the basis of the matching. For example, it is enabled that information (e.g. a computer file) is transmitted or received between the devices 310, 320, or that one of the devices 310, 320 or the user thereof performs a specific process for the sake of the other of the devices 310, 320 or the user thereof (e.g., an electronic gate interworking with the second device 320 is opened for the sake of the user of the first device 310.)

Meanwhile, although it has been mainly described herein that various types of characteristic information on the devices 310, 320 are determined on the basis of various types of trajectories and singular points resulting from a motion of the first device 310, the basis information may be adopted with reference to prior art without limitation, as long as it is caused by the motion of the first device 310. For example, the basis information may be property information of a wave in a coordinate system or a coordinate axis, which is identified in the first device 310 or the second device 320 according to the motion of the first device 310. Examples of the types of the property information include the following:

Types of the property information of the wave in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for a first, second, third or higher order derivative of the wave; and Types of the property information of the wave in frequency domain: spectral centroid, spectral density, spherical harmonics, total average spectral energy, band energy ratios for every octave, log spectral band ratios, linear prediction-based cepstral coefficients (LP-CCs), perceptual linear prediction (PLP) cepstral coefficients, mel-frequency cepstral coefficients, frequency topology, or the above properties computed for a first, second, third or higher order derivative of a frequency domain representation of the wave.

Meanwhile, although it has been illustratively described herein that the application of the first device 310 or the application of the second device 320 determines various types of characteristic information according to the motion of the first device 310, it is apparent that at least a part of the determination of the characteristic information may also be performed by the matching system 200, which may perform the matching according to the invention.

Third Embodiment

A variety of matching methods have been described in connection with the first and second embodiments. The matching is basically made when an association, which is diverse as described above, is recognized between the first device 310 and the second device 320. The required degree of association may be adaptively changed as necessary.

That is, the matching system 200, the first device 310, or the second device 320 may adjust (alleviate) the degree of association required for the matching, with respect to the characteristic information on a motion of the first device 310 determined by the first device 310 and the characteristic information on the motion of the first device 310 determined by the second device 320. The alleviation may be performed on the basis of (i) a history indicating that the first device 310 and the second device 320 have been matched before, (ii) a proof that the first device 310 and the second device 320 have been used or are owned by the same user (e.g., travel route information, owner information or the like of the devices), or (iii) the fact that the first device 310 and the second device 320 use the same communication network 100 (e.g., the same Wi-Fi access point (AP)).

In the same principle, such alleviation may also be applied in requiring an association between the characteristic information on a motion of the first device 310, which is determined by the first device 310, and the characteristic information on an input to the second device 320 according to the motion of the first device 310, an operation on the second device 320 according to the motion of the first device 310, or a location change of the first device 310 caused by the motion of the first device 310, which is determined by the second device 320.

Specifically, the alleviation may preferably be implemented in a manner of recognizing an association, for example, even if the two devices 310, 320 exhibit the association for fewer times or for a shorter time period, or even if a signature or pattern is partially inputted.

The Case in which Three or More Devices are Matched

As described above, the matching according to the invention is basically made between one first device 310 and one second device 320. However, the present invention may also be very useful when multiple devices act as different first devices 310 in relation to the second device 320, respectively.

Figure 9:
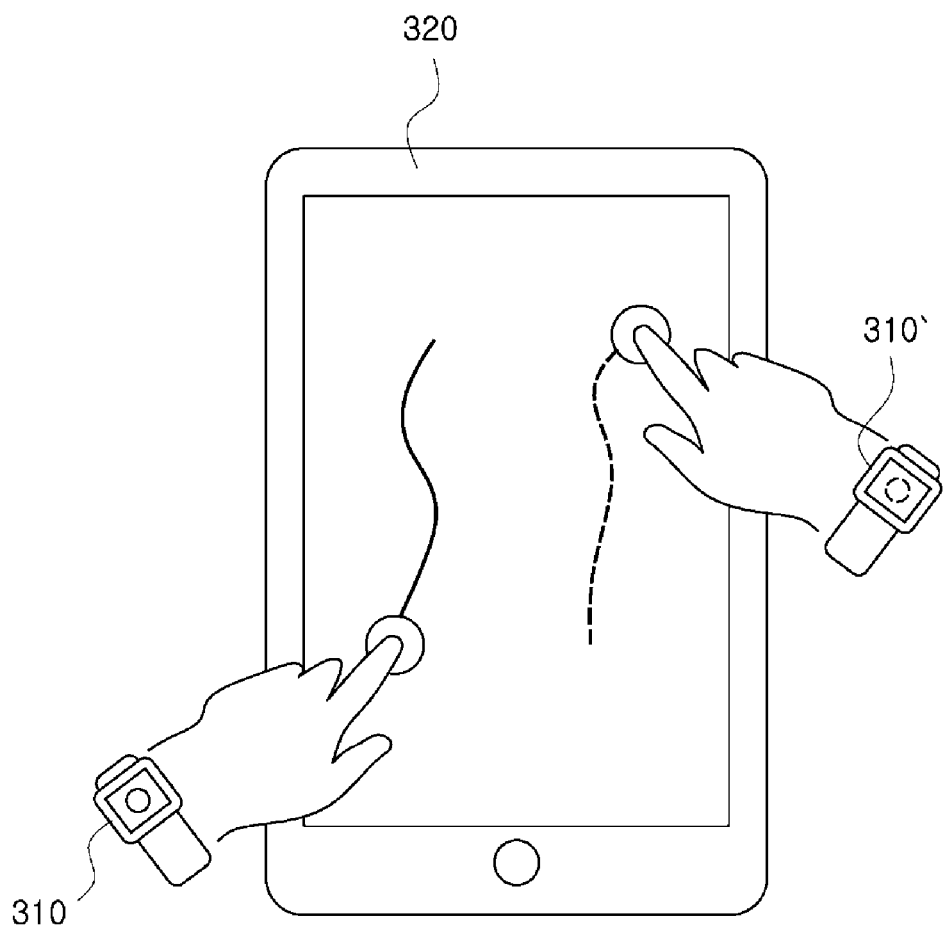
FIG. 9 is a reference view showing that two first devices are respectively matched with one second device according to one embodiment of the invention.

FIG. 9 is a view showing that two first devices 310, 310' are respectively matched with one second device 320 according to one embodiment of the invention. That is, when it is determined that multiple first devices 310, 310' are matched with the second device 320, the second device 320 may provide different types of user experience with respect to the input of each of the matched counterparts. The different types of user experience may be different forms of touch trace lines as shown, but may also be different sound responses or tactual responses.

Meanwhile, when the first device 310 and the second device 320 are matched and paired with each other, there may be another third device that is matched only with one of them. In this case, the other of the pair of the devices 310, 320 may be automatically matched with the third device. The above-described association may not be necessarily required for the automatic matching.

The automatic matching may be useful in the following cases, for example. It is assumed that the first device 310 is a smart watch, the second device 320 is a smart pad, and the third device (not shown) is a smart glass including a camera. In this case, the first device 310 and the second device 320 may be matched with each other as a user wearing the first device 310 on a right wrist (if right-handed) makes a gesture of sliding a graphical object for slide-to-unlock of the second device 320 with a right hand to unlock the second device 320. Here, when the above matching is made, the third device may observe a motion of the first device 310 according to the above gesture of the user so that it may be separately matched with the first device 310. In this case, the second device 320 and the third device may be automatically matched on the ground that they are respectively matched with the first device 310, even if no particular association is recognized between them.

Main Steps of the Matching Methods

Figure 4:
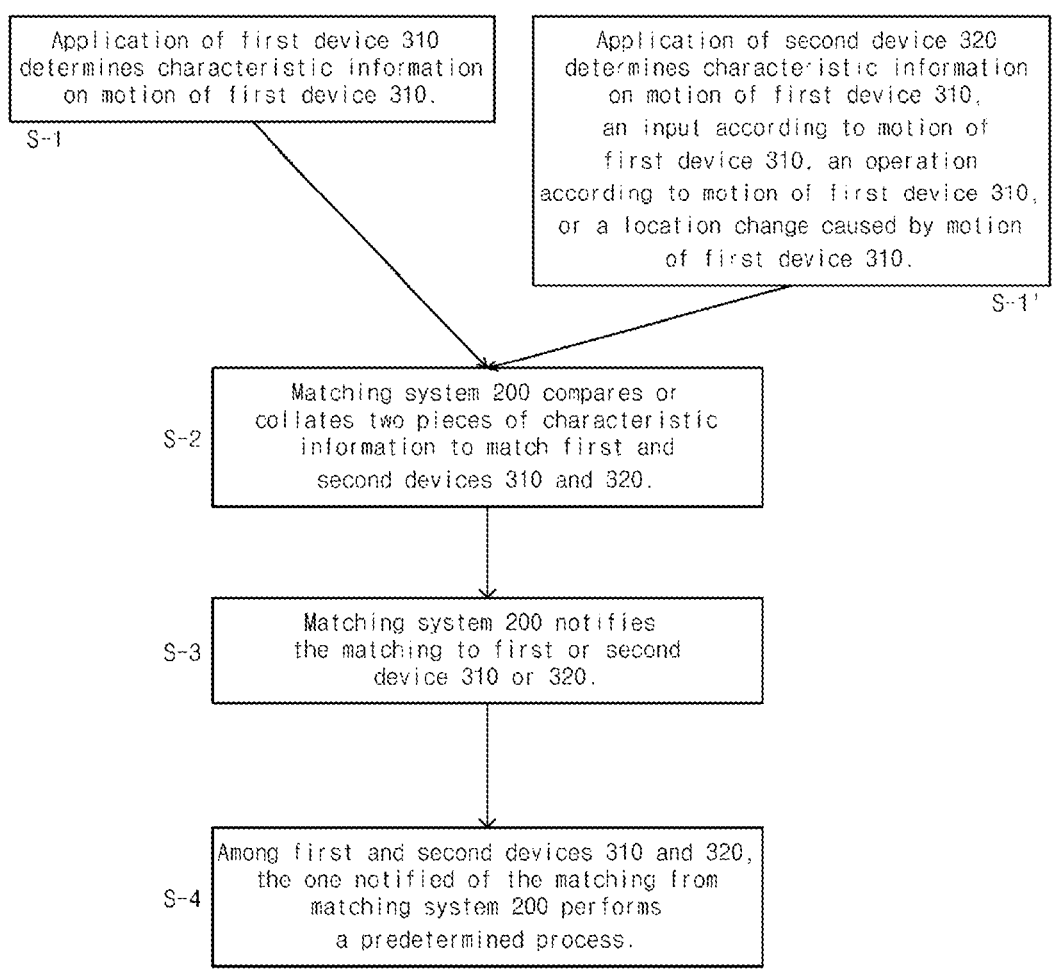
FIG. 4 is a flow chart showing the main steps of a matching method according to one embodiment of the invention.

As described above, the matching methods of the invention may be implemented with various embodiments. Referring to FIG. 4, the main steps of the matching methods, which may be common to those embodiments, will be discussed. FIG. 4 is a flow chart showing the main steps of a matching method according to one embodiment of the invention.

In step S-1, an application of the first device 310 may determine characteristic information on a motion of the first device 310.

Further, in step S-1', an application of the second device 320 may determine characteristic information on the motion of the first device 310, an input according to the motion of the first device 310, an operation according to the motion of the first device 310, or a location change caused by the motion of the first device 310 (i.e., characteristic information on at least one of the above four events).

Here, any one of step S-1 and step S-1' may precede the other, or both may be performed at the same time.

Next, in step S-2, the matching system 200 may compare or collate the two pieces of the characteristic information to match the first device 310 and the second device 320.

Next, in step S-3, the matching system 200 may notify the matching to the first device 310 or the second device 320.

Lastly, in step S-4, among the first device 310 and the second device 320, the one notified of the matching from the matching system 200 may perform a predetermined process.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A matching method comprising:
    determining, from a perspective of a first device, first characteristic information on a motion of the first device;
    determining, from a perspective of a second device, second characteristic information distinct from the first characteristic information and related to the motion of the first device, wherein the second characteristic information comprises information on at least one of the motion of the first device observed and captured by the second device, an input associated with a gesture of a user of the first device and made to the second device with respect to the motion of the first device, an operation associated with a gesture of the user of the first device and performed on the second device with respect to the motion of the first device, and a location change of the first device caused by the motion of the first device; and
    matching the first device and the second device based on the first characteristic information and the second characteristic information.

2. The method of claim 1, wherein the first device includes at least one of a motion sensor, an acceleration sensor, a gyro sensor, a magnetic sensor, and a camera, and the first characteristic information is internally determined in the first device.

3. The method of claim 1, wherein the second characteristic information comprises information on the motion of the first device observed and captured by the second device,
    the second device communicates with a camera, and
    the second characteristic information is determined based on a series of images captured by the camera.

4. The method of claim 1, wherein the second characteristic information comprises information on the input associated with a gesture of the user of the first device and made to the second device with respect to the motion of the first device,
    the second device communicates with a touch panel, and
    the second characteristic is determined based on a user gesture for the touch panel.

5. The method of claim 1, wherein the second characteristic information comprises information on the input associated with a gesture of the user of the first device and made to the second device with respect to the motion of the first device,
    the second device communicates with a pointing tool, and
    the second characteristic information is determined based on a user gesture for the pointing tool.

6. The method of claim 1, wherein the second characteristic information comprises information on the operation associated with a gesture of the user of the first device and performed on the second device with respect to the motion of the first device,
    the operation is for a graphical object on the second device, and
    the second characteristic information is determined based on a user gesture for the graphical object.

7. The method of claim 1, wherein the second characteristic information comprises information on the location change of the first device caused by the motion of the first device, and the second characteristic information is determined based on a location measurement of a beacon for the first device.

8. The method of claim 1, wherein the first device and the second device are matched temporarily.

9. The method of claim 1, wherein matching the first device and the second device comprises reporting the matching by means of the first device or the second device.

10. The method of claim 1, wherein matching the first device and the second device based on the first characteristic information and the second characteristic information comprises authenticating the user to use the second device.

11. The method of claim 1, wherein matching the first device with the second device comprises at least one of indicating that the first device and the second device belong to the user, indicating that the first device and the second device function for the sake of the user, indicating that the first device and the second device are located substantially close to each other, or indicating that one of the first device and the second device is competent to authenticate or permit the other of the first device and the second device.

12. A device comprising:
program circuitry configured to determine, based on a physical value regarding a motion of the device, first characteristic information on the motion,
wherein the device is matched with an external device based on the first characteristic information and second characteristic information, which is determined by the external device, distinct from the first characteristic information and related to the motion, and
the second characteristic information comprises information on at least one of the motion observed and captured by the external device, an input associated with a gesture of a user of the device and made to the external device with respect to the motion, an operation associated with a gesture of the user of the device and performed on the external device with respect to the motion, and a location change of the device caused by the motion.

13. The device of claim 12, further comprising at least one of a motion sensor, an acceleration sensor, a gyro sensor, a magnetic sensor, and a camera, and
wherein the physical value is calculated by means of at least one of the motion sensor, the acceleration sensor, the gyro sensor, the magnetic sensor, and the camera.

14. A server system for matching, comprising:
a matching unit configured to match a first device and a second device based on first characteristic information, which is determined from a perspective of the first device, on a motion of the first device, and second characteristic information, which is determined from a perspective of the second device, distinct from the first characteristic information and related to the motion of the first device, wherein the second characteristic information comprises information on at least one of the motion of the first device observed and captured by the second device, an input associated with a gesture of a user of the first device and made to the second device with respect to the motion of the first device, an operation associated with a gesture of the user of the first device and performed on the second device with respect to the motion of the first device, and a location change of the first device caused by the motion of the first device; and
a storage configured to store information provided from at least one of the first device and the second device.

15. The server system of claim 14, wherein the first device includes at least one of a motion sensor, an acceleration sensor, a gyro sensor, a magnetic sensor, and a camera, and
the first characteristic information is internally determined in the first device.

16. The server system of claim 14, wherein the second characteristic information comprises information on the motion of the first device observed and captured by the second device,
the second device communicates with a camera, and
the second characteristic information is determined based on a series of images captured by the camera.

17. The server system of claim 14, wherein the second characteristic information comprises information on the input associated with a gesture of the user of the first device and made to the second device with respect to the motion of the first device,
the second device communicates with a touch panel, and
the second characteristic information is determined based on a user gesture for the touch panel.

18. The server system of claim 14, wherein the second characteristic information comprises information on the input associated with a gesture of the user of the first device and made to the second device with respect to the motion of the first device,
the second device communicates with a pointing tool, and
the second characteristic information is determined based on a user gesture for the pointing tool.

19. The server system of claim 14, wherein the second characteristic information comprises information on the operation associated with a gesture of the user of the first device and performed on the second device with respect to the motion of the first device,
the operation is for a graphical object on the second device, and
the second characteristic information based on a user gesture for the graphical object.

20. The server system of claim 14, wherein the second characteristic information comprises information on the location change of the first device caused by the motion of the first device, and
the second characteristic information is determined based on a location measurement of a beacon for the first device.

* * * * *